United States Patent [19]
Chianh

[11] Patent Number: 5,690,819
[45] Date of Patent: Nov. 25, 1997

[54] STRUCTURE OF BIOCHEMICAL FILTER BALL

[76] Inventor: Yung Huang Chianh, No. 46, Shoou Faa Road, Tao Yuan City, Taiwan

[21] Appl. No.: 680,661

[22] Filed: Jul. 16, 1996

[51] Int. Cl.$^6$ .................... C02F 3/10; B01J 19/30
[52] U.S. Cl. ............ 210/150; 210/616; 261/94; 261/DIG. 72
[58] Field of Search ............ 210/150, 151, 210/169, 616, 617; 261/94, 95, DIG. 72

[56] References Cited

U.S. PATENT DOCUMENTS

| | | | |
|---|---|---|---|
| 2,212,932 | 8/1940 | Fairlie | 261/94 |
| 3,399,914 | 9/1968 | Grant | 261/DIG. 72 |
| 3,957,931 | 5/1976 | Ellis et al. | 210/150 |
| 4,115,269 | 9/1978 | Bennett et al. | 210/150 |
| 4,203,935 | 5/1980 | Hackenjos | 261/DIG. 72 |
| 4,581,299 | 4/1986 | Jäger | 261/DIG. 72 |
| 4,668,442 | 5/1987 | Lang | 261/94 |
| 4,724,593 | 2/1988 | Lang | 261/94 |
| 4,842,920 | 6/1989 | Banai et al. | 210/150 |
| 5,108,594 | 4/1992 | Giovanetti et al. | 210/151 |

*Primary Examiner*—Neil McCarthy
*Assistant Examiner*—Theodore M. Green
*Attorney, Agent, or Firm*—Pro-Techtor International

[57] ABSTRACT

A biochemical filter ball that substitutes for the parallel elongated vertical plates of standard biochemical balls a plurality of vertical, transverse, and angled plates which have intersecting angles of about 90 and 45 degrees with one another. All the plates are parallel to a central axis. With such an arrangement, no matter what orientation the biochemical filter balls may take, they will all effectively retain the filtered water on their plates. By this placement of the vertical, transverse and angled plates, surface area for water retention as well as the flow time of the filtered water can be increased. Thus oxygen content in water can be increased, and the object of having improved efficiency of biochemical filtering can be achieved.

8 Claims, 4 Drawing Sheets

STRUCTURE OF BIOCHEMICAL FILTER BALL

BACKGROUND OF THE INVENTION

1. Field of the Invention

The present invention relates to an improved structure of a biochemical filter ball which includes therein a plurality of vertical plates, transverse plates and angled plates. The biochemical filter ball can be used for filtering trickling water in a wide angular area no matter what orientation it is given. The total surface area of these plates is so large, and available orientation is so wide, that trickling time can be extended to increase oxygen content as well as toxic gas elimination. A plurality of round plates are provided on the periphery of the biochemical filter ball, which will effectively eliminate the disadvantage induced in overlapping balls.

2. Description of the Prior Art

Aquariums are present in many houses. However, good water quality is required by aquatic creatures. Filtering equipment is therefore very important for the aquatic creatures. Biochemical filter balls for aquarium cabinets are based on the principle of resolving discharge of, and residual food material for, fish in water by means of nitrobacteria that increase the oxygen content in the water. Conventional biochemical filter balls generally have the structure as shown in FIG. 1. In each of the spherical balls, there are numerous parallel elongated vertical plates 11, a jointing ring 10, and a plurality of annular sheets 12 that encircle the ball. When water in an aquarium cabinet is drawn out by a pump (not shown), it is directed into a case having biochemical filtering balls after being filtered by some other equipment. The numerous biochemical filter balls overlapping one another create the phenomenon following:

Water drops gradually down form the uppermost layer of biochemical filter balls into the aquarium cabinet. Water clings to the elongated vertical plates 11, the jointing ring 10, and the annular sheets 12, and then drops down slowly. This can increase oxygen content. Moreover, nitrobacteria can be advantageously used in filter.

However, when the conventional parallel elongated vertical plates 11 are placed in parallel with the direction of water flow, the water will flow through the biochemical filter balls very rapidly because it hardly touches the vertical plates 11. It is clear that the water will not be adequately filtered because there is no clinging of the water to the biochemical filter balls or the contact is for too short a time. Oxygen content is not greatly increased. This shortcoming in the efficiency of filtering is a very big disadvantage of the prior art.

SUMMARY OF THE INVENTION

In view of this, the inventor of the present invention provides an improved structure to solve the above mentioned disadvantage.

The principal object of the present invention is to substitute for the parallel elongated vertical plates 11 to a plurality of vertical, transverse, and angled plates which have intersecting angles of about 90 and 45 degrees with one another. All the plates are parallel to a central axis. With such an arrangement, no matter what orientation the biochemical filter balls may take, they will all effectively retain the filtered water on their plates. By this placement of the vertical, transverse and angled plates, surface area for water retention as well as the flow time of the filtered water can be increased. Thus oxygen content in water can be increased, and the object of having improved efficiency of biochemical filtering can be achieved.

The present invention will be apparent in its practical structure and functions after reading the detailed description of the preferred embodiment thereof in reference to the accompanying drawings.

DETAILED DESCRIPTION OF THE PREFERRED EMBODIMENT

Figure 1:
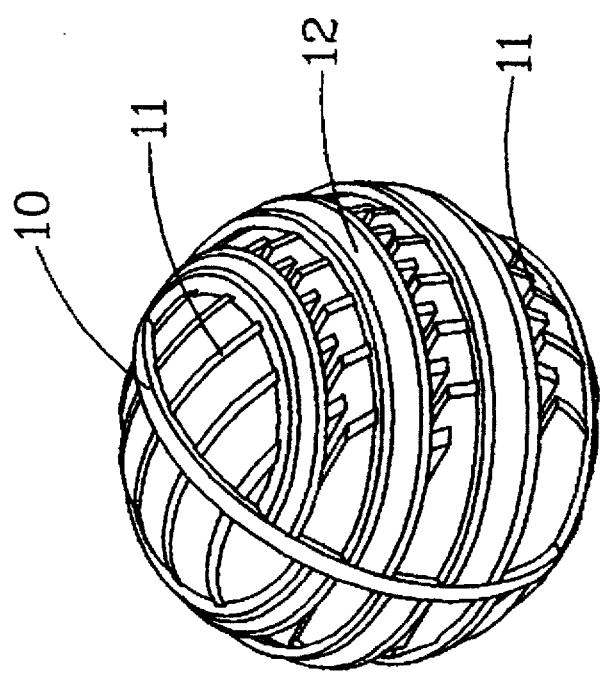
FIG. 1 is a perspective view of a conventional biochemical filter ball.
Figure 2:
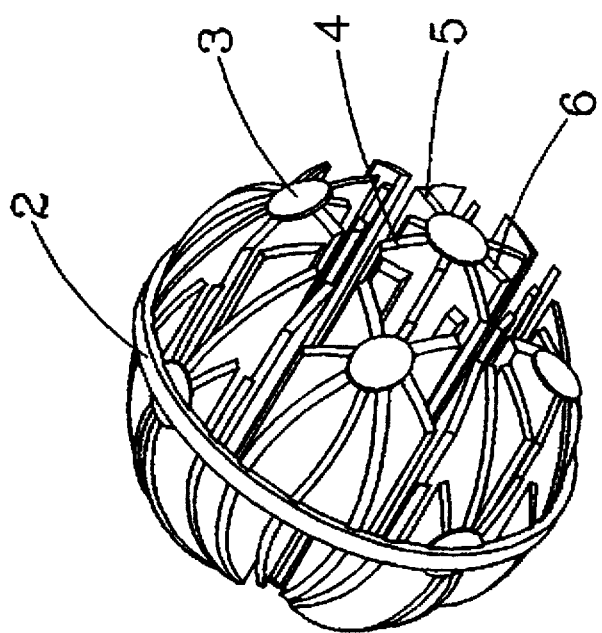
FIG. 2 is a perspective view of a biochemical filter ball of the present invention.
Figure 3:
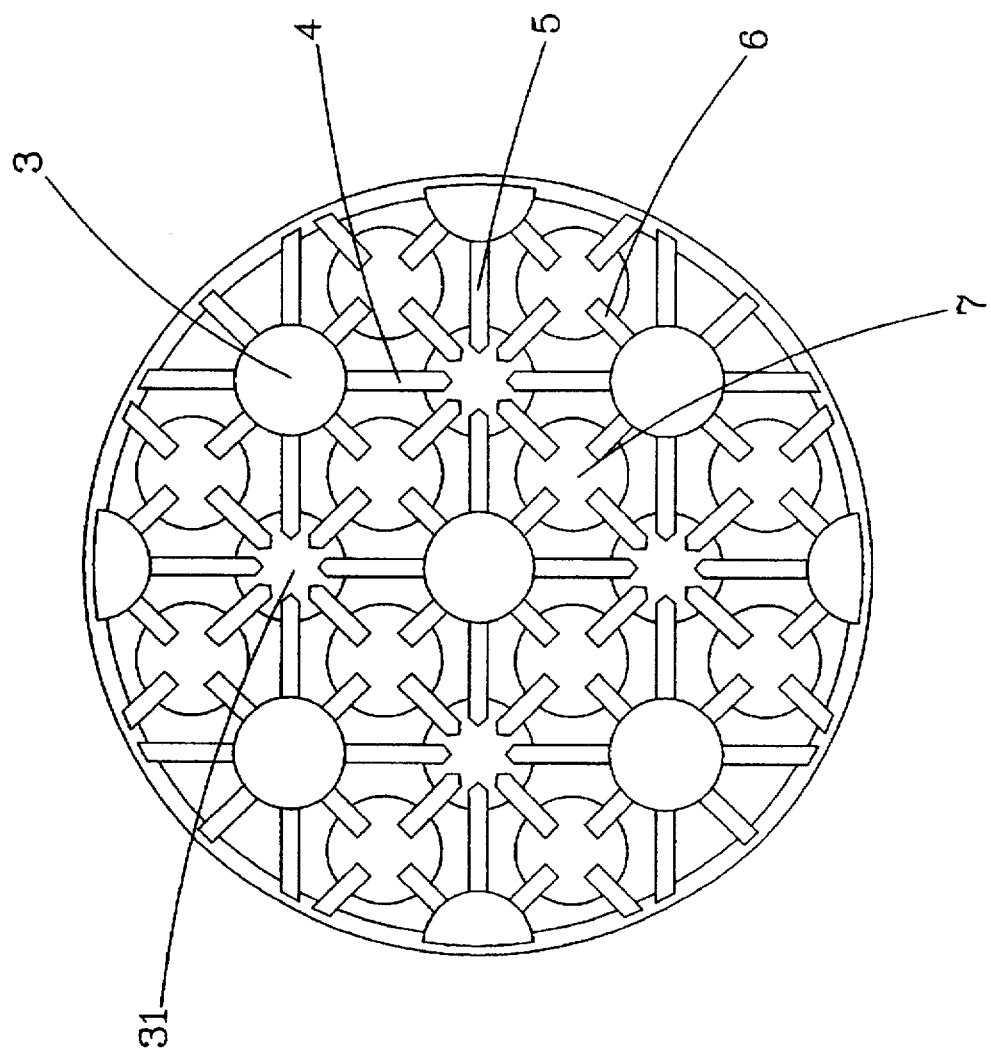
FIG. 3 is a schematic perspective view of the structure of the biochemical filter ball of the present invention.
Figure 4:
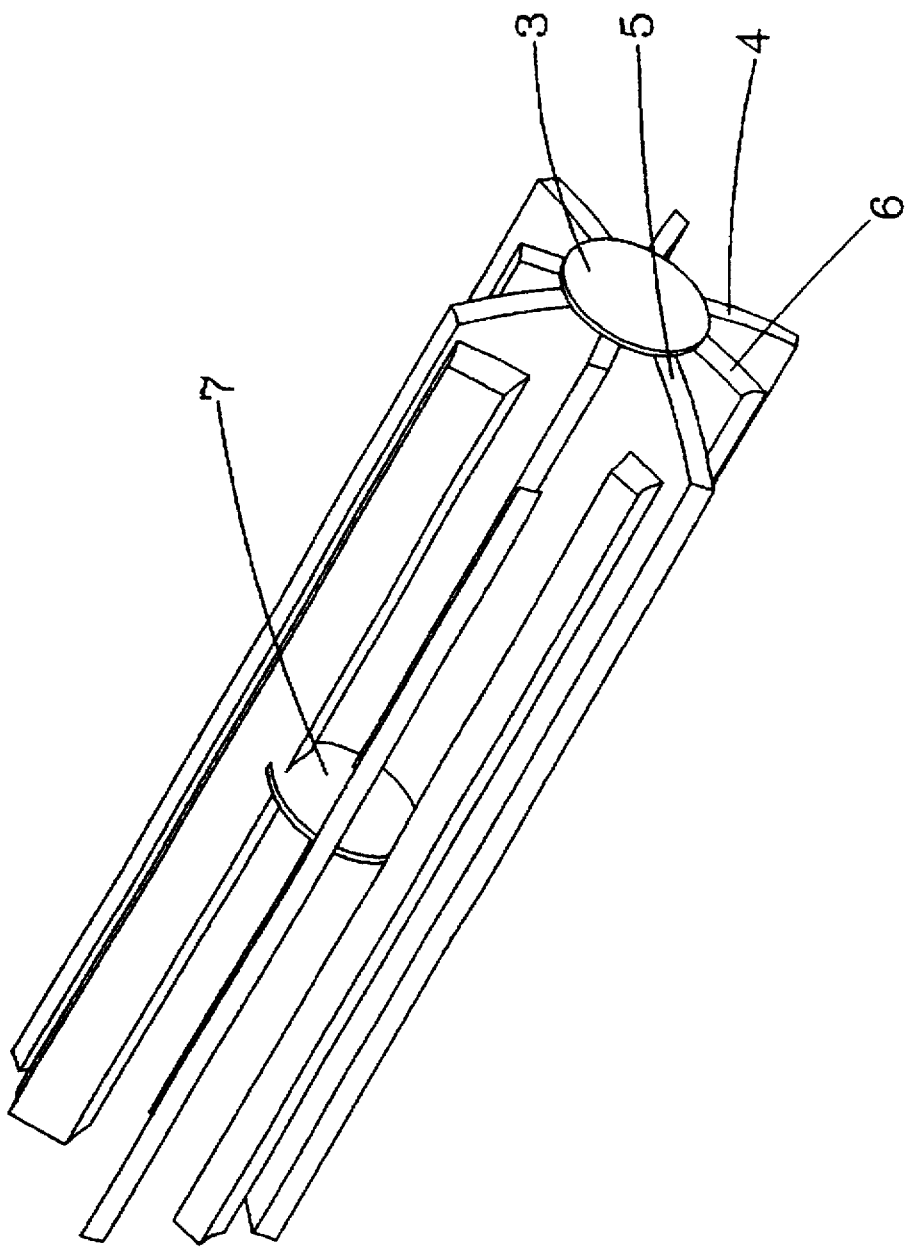
FIG. 4 is a schematic perspective view of a partial structure of the biochemical filter ball of the present invention.

Referring now to FIGS. 2, 3 and 4, the improved structure of a biochemical filter ball of the present invention is spherical. For structural strength and for ease of molding, a jointing ring 2 is still provided. A plurality of vertical plates 4, transverse plates 5, and angled plates 6 at centers of those of the plates at the periphery of the ball. The vertical plates 4, the transverse plates 5 and the angled plates 6 are parallel with other plates of the same type. The vertical plates 4 and the transverse plates 5 intersect at approximately 90 degree angles. The angled plates 6 and the transverse plates 5 intersect at approximately 45 degree angles. A plurality of round plates 3 are provided on the external ends of the vertical plates 4, the transverse plates 5, and the angled plates 6 to connect all the plates. The present invention has the following structural characteristics:

1. The vertical plates 4, the transverse plates 5, and the angled plates 6 are arranged according to the angles described above. The front ends of the joined plates are connected by round plates 3 (as shown in FIG. 3).

2. Similar round plates 31 provided at the rear side of the balls, to join the plates 4, 5 and 6. The round plates 3, 31 are arranged so that they can b released from the front and the rear half molds during manufacturing. The round plates 3, 31 are arranged in staggered conformation over the front and the rear sides of the balls, so that any given pair of plates 3, 31 are not directly aligned. A plurality of connecting pieces 7 are provided in central areas of the angled plates. By means of the round plates 3, 31 and the connecting pieces 7, the vertical plates 4, the transverse plates 5, and the angled plates 6 are firmly connected together.

4. The round plates 3, 31 and the connecting pieces 7 are all arranged alternately as shown in FIG. 3.

According to the above analysis of characteristics, it can be understood that, with the same volume of filter ball, the present invention can have a total surface area of all the plates which is several times that of a conventional ball. The filter ball of the present invention can therefore lengthen flow time of water, through the ball and therefore increase oxygen content in the water. Thus toxic substances such as ammonia can be eliminated. The angular arrangement of the vertical plates 4, the transverse plates 5, and the angled plates 6 causes water to remain in contact with the plates while flowing through the ball.

When numerous biochemical filter balls are lapped with one another, total effective surface area of conventional plates can be reduced due to interengagement of the plates. Thus air flow rate can be lowered. The present invention can effectively eliminate interengagement of the plates.

In conclusion, an improved structure of a biochemical filter ball of the present invention not only eliminates the disadvantages of the prior art. The structure of the ball of the present invention provides good ventilation of air, increased total effective surface area, and lengthened flow time, all of which can improve filtering efficiency of the ball.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

I claim:

1. A filter ball comprising:
   a plurality of vertical plates,
   a plurality of transverse plates,
   a plurality of angled plates,
   and a jointing ring; wherein
   said jointing ring connects said vertical plates, said transverse plates, and said angled plates in a spherical conformation,
   said vertical plates and said transverse plates meet at angles of approximately 90 degrees, and said angled plates meet said vertical plates and said transverse plates at angles of approximately 45 degrees, a plurality of connecting plates are provided on external ends of said vertical plates, said transverse plates, and said angled plates to connect said plates.

2. The biochemical filter ball as claimed in claim 1, wherein:
   said connecting plates are in a staggered conformation such that center points of any two connecting plates do not define a line that does not intersect said plates.

3. The biochemical filter ball as claimed in claim 2, wherein:
   a plurality of connecting pieces are provided at central portions of said angled plates.

4. The biochemical filter ball as claimed in claim 2, wherein:
   said connecting plates are round.

5. The biochemical filter ball as claimed in claim 2, wherein:
   said connecting plates are polygonal.

6. The biochemical filter ball as claimed in claim 1, wherein:
   a plurality of connecting pieces are provided at central portions of said angled plates.

7. The biochemical filter ball as claimed in claim 1, wherein:
   said connecting plates are round.

8. The biochemical filter ball as claimed in claim 1, wherein:
   said connecting plates are polygonal.

* * * * *